United States Patent [19]

Trefz

[11] Patent Number: 5,171,342
[45] Date of Patent: Dec. 15, 1992

[54] FILTER INSERT FOR AIR FILTERS USED IN A DUST-FILLED ENVIRONMENT

[75] Inventor: Walter Trefz, Backnang, Fed. Rep. of Germany

[73] Assignee: Filterwerk Mann & Hummel GmbH, Ludwigsburg, Fed. Rep. of Germany

[21] Appl. No.: 768,046

[22] Filed: Oct. 1, 1991

Related U.S. Application Data

[63] Continuation-in-part of Ser. No. 560,723, Jul. 31, 1990, abandoned.

[30] Foreign Application Priority Data

Jul. 31, 1989 [DE] Fed. Rep. of Germany ....... 3925277

[51] Int. Cl.⁵ .............................................. B01D 46/00
[52] U.S. Cl. ...................................... 55/487; 55/498; 55/528
[58] Field of Search ................. 55/486, 487, 510, 498, 55/528; 210/489, 490, 493.1, 491, 492, 315

[56] References Cited

U.S. PATENT DOCUMENTS 3,680,659 8/1972 Kasten ..................................... 55/498
4,259,096 3/1981 Nakamura et al. ..................... 55/486

FOREIGN PATENT DOCUMENTS 900450 7/1962 United Kingdom ................... 55/486
909894 11/1962 United Kingdom ................... 55/487

Primary Examiner—Bernard Nozick
Attorney, Agent, or Firm—Foley & Lardner

[57] ABSTRACT

A filter insert 10 for an air filter for internal combustion engines, compressors or other air-aspirating machinery, which filter insert consists of a filter ring 13 formed of pleated filter paper 19 through which air flows radially and an additional filter element disposed concentric to the filter ring 13, which additional filter element is a fleece 16 formed of nonwoven synthetic fiber, optionally treated with an oil which acts as an adherent for dust.

6 Claims, 3 Drawing Sheets

FILTER INSERT FOR AIR FILTERS USED IN A DUST-FILLED ENVIRONMENT

CROSS-REFERENCE TO RELATED APPLICATIONS

This application is a continuation-in-part of my copending U.S. patent application Ser. No. 07/560,723 filed Jul. 31, 1990 now abandoned.

BACKGROUND OF THE INVENTION

This invention relates to a filter insert for air filters of internal combustion engines, compressors and other air-aspirating machines comprising axial end plates and a filter ring of pleated filter paper through which air flows radially, and an additional filter element disposed concentric with the filter ring.

Such air filter inserts must have a great dust-removing ability over their entire period of use and must have a great dust-accumulating capacity. Another requirement is a very low resistance to the flow of air, but this resistance increases with increasing dust loading, and finally, when a given limit is reached, it necessitates changing of the filter insert.

To filter the intake air of air-aspirating machines filter inserts are widely used in which the filter medium consists of pleated filter paper. Such construction of the filter insert permits comparatively large filter areas to be contained in a small amount of space. Large filter surface areas are particularly needed in filters used in a dusty environment such as occurs, for example, in filters used in work vehicles, earth-moving machines, farm machinery and the like, large filter surface areas are needed.

Paper filters for dusty environments are commonly used in practice which have a surface area of approximately 4000 $cm^2$ to 6000 $cm^2$ with a thickness of 0.3 to 0.6 mm and a density of 0.2 to 0.3 $g/cm^3$ per cubic meter of aspirated air per minute. For low-dust operation, for example in passenger automobiles generally driven on paved roads, a paper filter surface area on the order of only 1500 $cm^2$ per cubic meter of aspirated air per minute is usually provided. However, an open-pore paper is thereby used.

To achieve the highest possible dust filtering action, U.S Pat. No. 3,397,793 discloses a filter insert provided with two filter rings (paper bellows) of pleated filter paper of equal radial depth arranged concentrically. Between the two filter rings is a supporting ring of perforated sheet metal, and additional supporting rings are disposed on the outer circumference of the outer filter ring and on the inner circumference of the inner filter ring. According to this patent the filter paper of the inner filter ring is provided with smaller pores than the filter paper of the outer filter ring, in order thus to achieve filtration in stages. A disadvantage of this arrangement is to be seen first in the fact that a total of three supporting rings are necessary, and each supporting ring of course increases the resistance to air flow.

It is known that the initial filtering action in the type of filter paper used here is lower than the average filtering action. The reason for the increase in filtering action over the entire period of operation is to be found in the fact that, while the filter is in operation, a filter cake is formed by the deposition of the filtered particles on the filter paper, which then filters out even very small dust particles.

However, if, as described in the U.S. Pat. No. 3,397,793, a filter paper with very small pores is used, there is a danger that these small pores will rapidly become clogged, thereby substantially reducing the filter's useful operating life. Furthermore, the use of a second filter ring consisting of pleated filter paper requires a considerable amount of space, so that the filtering surface area of the first filter ring is reduced by this second filter, and consequently the required filter surface area can be achieved only by increasing the outside diameter of the filter insert.

SUMMARY OF THE INVENTION

It is therefore the object of the present invention to provide a filter insert which avoids the aforementioned disadvantages of the prior art.

Another object of the invention is to provide a filter insert which occupies a minimum of space and at the same time avoids excessive increases of resistance to air flow.

A further object of the invention is to provide a filter insert with improved filtering ability, particularly san improved initial filtering ability.

These and other objects of the invention are achieved by providing a filter insert for filters of internal combustion engines, compressors and other air-aspirating machines, comprising axial end plates and a filter ring which consists of pleated filter paper through which air flows radially, and an additional filter element disposed concentric with the filter ring, wherein the additional filter element is a fleece which directly contacts the filter ring without interposed supporting rings, and wherein the fleece is from 2 to 8 times as thick as the thickness of the filter paper.

In accordance with the invention it has been found that a nonwoven fabric or fleece, which has but a very low resistance to air flowing through it, is able, due to its properties and its texture, to trap very small dust particles and thus to improve considerably the initial filtering action, without the danger that this material might soon clog up, thus reducing its useful life. This fleece is in the form of a casing, so that no additional supporting ring is needed between the filter element and the fleece. Consequently, the increased resistance to air flow due to the presence of an additional supporting ring is avoided. The fleece has a thickness of 2 to 2.5 mm and therefore takes up but a very small amount of space within the filter insert.

It is known to use a fleece as a filter element which is constructed as a separate part and serves as a permanent safety element placed downstream from a normal filter insert. This safety element is intended to prevent dirt from entering the intake manifold of the internal combustion engine if the main filter insert becomes damaged. The safety element, however, is not replaced when the filter insert is changed and therefore does not serve to increase the initial filtering efficiency. Furthermore, since the element is a separate part, it requires at least one additional supporting ring, which again increases the resistance to air flow.

In accordance with a further embodiment of the invention, the fleece is made of polyester or polyacrylonitrile fibers and impregnated with an oil which serves as an adherent for dust. Due to the nature of the adherent, an even better trapping of very fine dust is achieved in the fleece.

To prevent damage and to improve the stability of the filter insert an outer and an inner supporting ring may be provided, with the inner supporting ring being in contact with the fleece.

BRIEF DESCRIPTION OF THE DRAWINGS

The invention will explained in further detail below with reference to an illustrative preferred embodiment shown in the accompanying drawings in which.

DETAILED DESCRIPTION OF PREFERRED EMBODIMENTS

Figure 1:
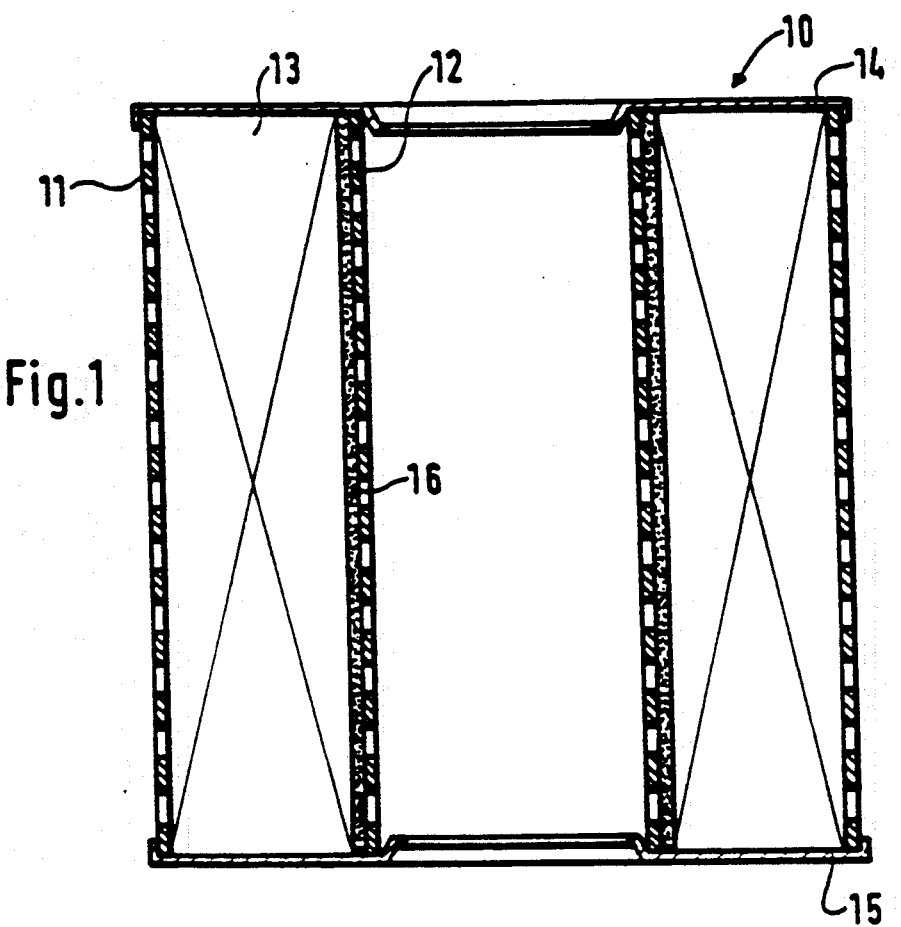
FIG. 1 is a cross section of a filter insert according to the invention.
Figure 2:
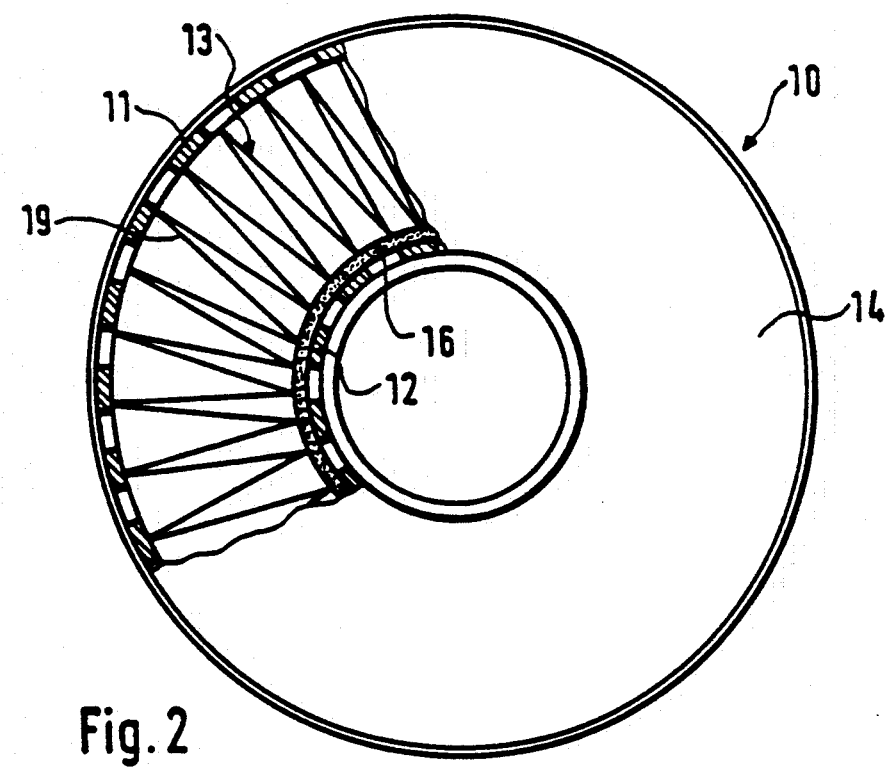
FIG. 2 is a top plan view of the filter insert of FIG. 1.

The filter insert 10 in FIGS. 1 and 2 has an outer supporting ring 11 and an inner supporting ring 12. Both supporting rings consist, for example, of perforated sheet metal. A filter ring 13, consisting of pleated filter paper 19, is provided between the two supporting rings 11 and 12. Both the filter ring 13 and the two supporting rings 11 and 12 are permanently bonded by an adhesive to annular end plates 14 and 15, so that the ends of the filter insert are tightly sealed. In operation, the air flows radially from the outside into the center of the filter.

Between the filter ring 13 and the supporting ring 12 there is inserted a fleece 16 which extends over the entire axial length of the filter insert 10 and is also fastened to the end plates 14 and 15. This fleece is tubular in shape and supports the inner folds of the filter ring 13 due to the stiffness of the material used, which may be, for example, a polyester or polyacrylonitrile fiber material. The fleece is arranged on the downstream side of the filter ring 13 in the direction of air flow. The folds of the filter ring contact or lie against the nonwoven fabric casing. The fleece is supported in each case by the adjoining supporting ring 11 or 12.

To better trap dust, the fleece may be treated or impregnated with an adherent. As it can be seen in FIGS. 1 and 2, the fleece has only a very small thickness which is of the order of magnitude of 2 to 2.5 millimeters. Because of the small thickness, the effective filter surface area of the filter ring 13 at equal outside dimensions of the filter insert is reduced only negligibly. The fleece therefore is a very space-saving means that is capable of increasing the filtering action.

It has been found that the use of the fleece increases the resistance to air flow only slightly. Since the fleece itself acts as a support for the filter ring 13, no additional supporting ring, which might increase the resistance to air flow, is needed between the filter ring 13 and the fleece 16.

Figure 3:
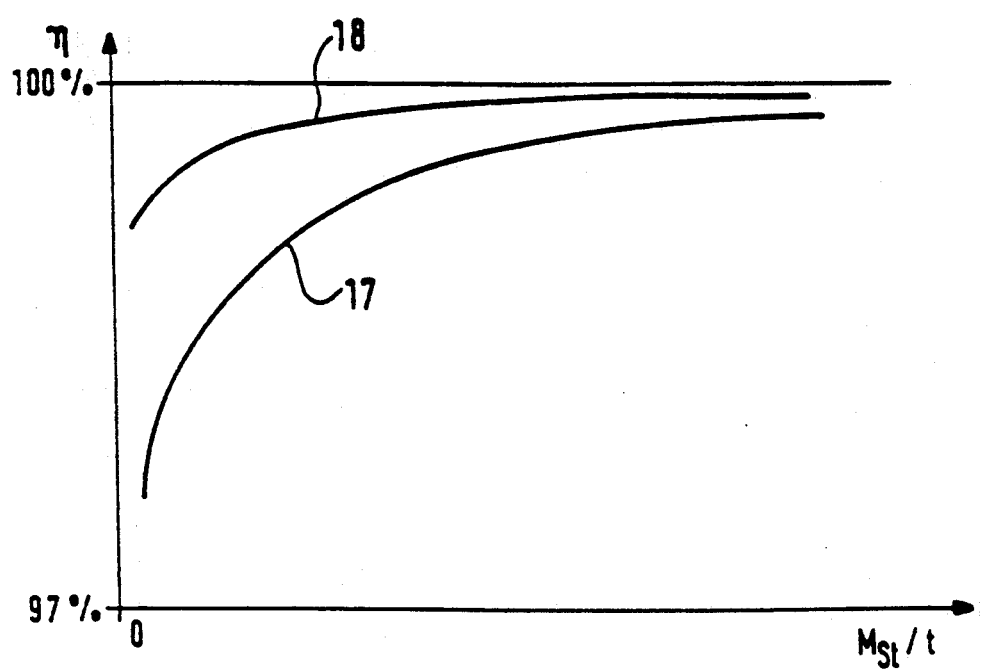
FIG. 3 is a diagram illustrating the filtering efficiency of the filter of the invention.

FIG. 3 shows a diagram indicating the degree of dust filtration as a function of the operating time of the filter insert. On the ordinate, the degree of dust filtration $\eta$ is plotted between the values of 97% and 100%, and the abscissa shows the dust exposure time starting from the time when the filter is first used. In the course of this time a quantity of dust $M_{st}$ accumulates on the filter insert. Assuming that the filter is exposed to a constant volume of dust, the amount of dust held on the filter can be considered proportional to the time of use.

Curve 17 shows the degree of dust filtration $\eta$ of a filter insert having only a single filter ring 13. In the initial phase the filtration degree is relatively low since no filter cake has as yet formed on the filter paper.

Curve 18 shows the degree of dust filtration $\eta$ for a filter insert 10 in accordance with FIGS. 1 and 2. It can be seen that the degree of filtration is substantially higher than in curve 17. It is evident that the use of a fleece is capable in the initial phase of operation of holding out the small dust particles which are passed through the filter paper. After the filter insert has been in operation for a longer period of time, only small differences in the degree of dust filtration can be found, however the amount of dust that passes the filter of the invention after a relatively long period of operation is only approximately half as great as that passed by the comparison filter. The diagram shows that, if the filter insert is changed very frequently, so that each new filter insert passes through this initial phase, an appreciable amount of dust can be filtered out by the use of the fleece.

Figure 4:
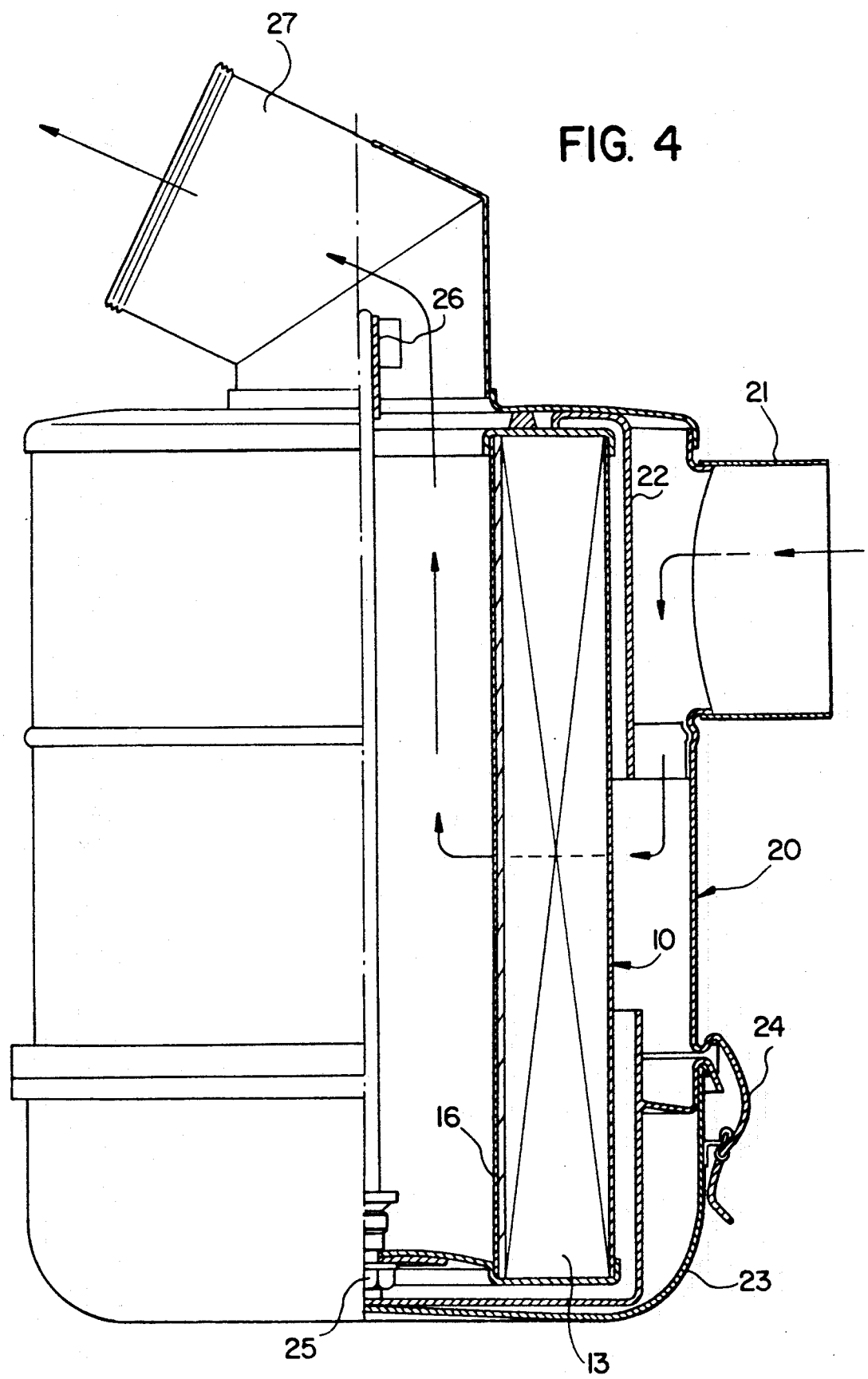
FIG. 4 is a partially cut-away elevational view showing the filter insert of the invention in a filter housing.

FIG. 4 illustrates the filter insert 10 of FIGS. 1 and 2 mounted in a filter housing 20. The housing is provided on its outer circumference with an air inlet 21 in communication with the annular space surrounding the filter insert 10. Incoming air is drawn through inlet 21 and impinges against a baffle 22, which shields the filter insert 10 against the direct impact of the air stream and any particles entrained therein. Baffle 22 also serves to disperse the incoming air stream so that it does not all impinge against a single small portion of the filter surface.

The housing 20 is provided with a base cover 23, which is attached to the housing by a catch 24. Inside the housing there is a central screw 25 with which the filter insert 10 is attached to the housing by means of a nut 26. An air outlet 27, through which filtered air exits the housing 20, is arranged at the top of housing in communication with the center space of the filter insert.

As indicated by the arrows, air flows in through the inlet 21 and is deflected into the space surrounding the filter insert 10 by baffle 22. The air flows radially inwardly first through the filter ring 13 and afterward through the fleece 16. Clean filtered air is then withdrawn from the center of the filter insert 10 through the outlet 27.

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all modifications falling within the ambit of the appended claims and equivalents thereof.

What is claimed is:

1. In combination, an air filter housing having a radially outward air inlet and a central air outlet, and an air filter inset arranged in said housing with its outer periphery in communication with said air inlet and its center in communication with said air outlet, said insert comprising axial end plates one of the end plates defining an air outlet and a filter ring which consists of a pleated filter paper through which air flows radially inwardly toward the center of said ring, and an additional filter element disposed concentric with said filter ring wherein said additional filter element comprises a synthetic fleece arranged downstream of said filter ring in the direction of air flow through said filter ring, said fleece directly contacting said filter ring without interposed supporting rings, and said fleece being from 2 to 8 times as thick as said filter paper.

2. An apparatus according to claim 1, wherein said fleece is arranged downstream of said filter ring in the direction of air flow through said filter ring.

3. An apparatus according to claim 1, wherein said additional filter element is situated within the annular opening of said filter ring.

4. An apparatus according to claim 3, wherein a first supporting ring is disposed on the outer circumference of said filter ring and an additional supporting ring is disposed on the inside of said fleece.

5. An apparatus according to claim 1, wherein said fleece is a synthetic fiber nonwoven material which is treated with an oil that acts as an adherent for dust.

6. An apparatus according to claim 5, wherein said nonwoven material consists of polyester or polyacrylonitrile fiber material.

* * * * *